United States Patent [19]
Harrison et al.

[11] Patent Number: 5,322,341
[45] Date of Patent: Jun. 21, 1994

[54] ARTICULATED SEAT ASSEMBLY

[75] Inventors: William D. Harrison, Rochester; Arduino Colasanti, East Detroit, both of Mich.

[73] Assignee: Findlay Industries, Troy, Mich.

[21] Appl. No.: 772,145

[22] Filed: Oct. 7, 1991

[51] Int. Cl.⁵ .................................. B60N 2/02
[52] U.S. Cl. ........................... 297/94; 297/99; 297/364
[58] Field of Search ............... 297/94, 95, 96, 97, 297/98, 99, 363, 364

[56] References Cited

U.S. PATENT DOCUMENTS

| | | | |
|---|---|---|---|
| 751,312 | 2/1904 | Leistner | 297/99 |
| 1,096,678 | 5/1914 | Budd | 297/99 |
| 1,190,441 | 7/1916 | Marsh | 297/97 |
| 1,577,026 | 3/1926 | Hansen | 297/99 |

FOREIGN PATENT DOCUMENTS

| | | | |
|---|---|---|---|
| 3540727 | 5/1987 | Fed. Rep. of Germany | 297/364 |
| 5918028 | 1/1984 | Japan | 297/94 |

*Primary Examiner*—Laurie K. Cranmer
*Attorney, Agent, or Firm*—Weintraub, DuRoss & Brady

[57] ABSTRACT

A vehicular seat assembly includes a seat back portion which is translatable from first position wherein the lower end of the seat back is disposed proximate the back edge of a seat base member to a second position wherein the lower end of the seat back is disposed proximate the front edge of the base member. A latching and adjustment mechanism for controlling the attitude of the back with respect to the base member is also described.

4 Claims, 2 Drawing Sheets

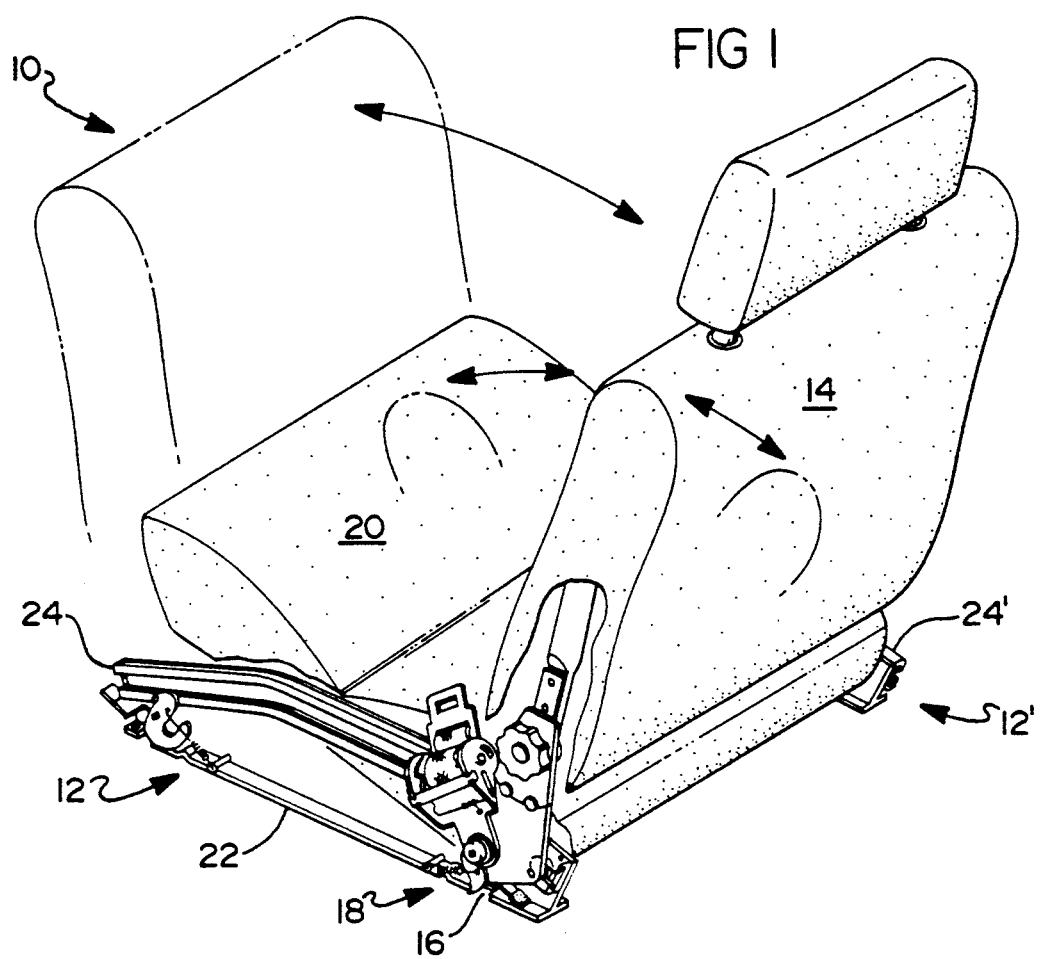
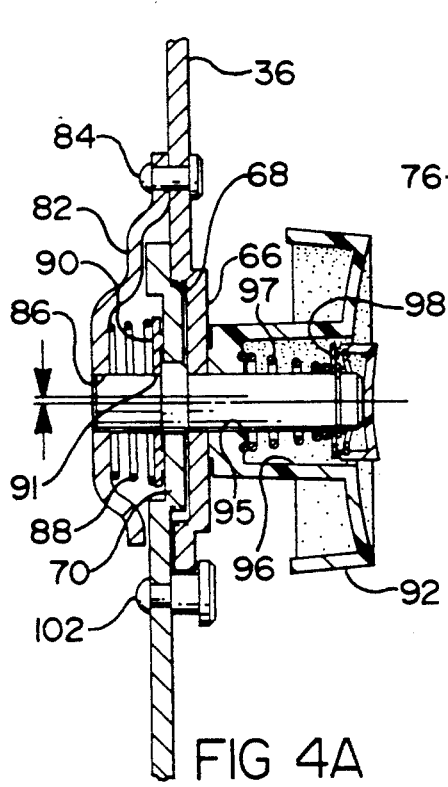
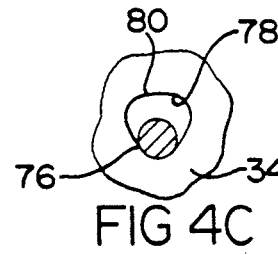
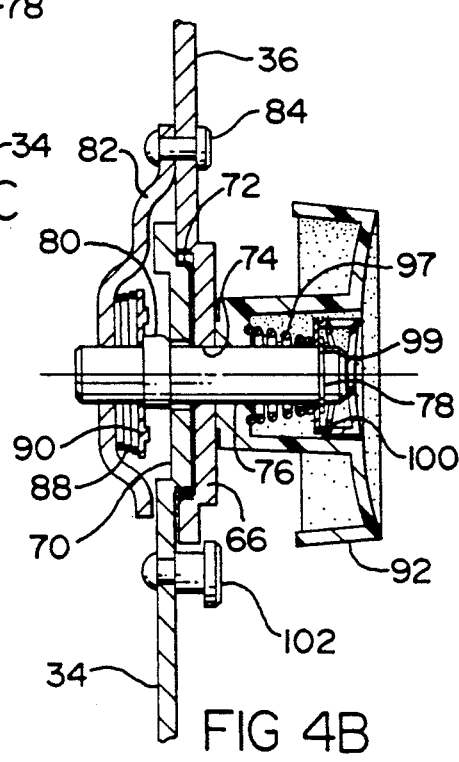
FIG 1
FIG 4C
FIG 4A
FIG 4B

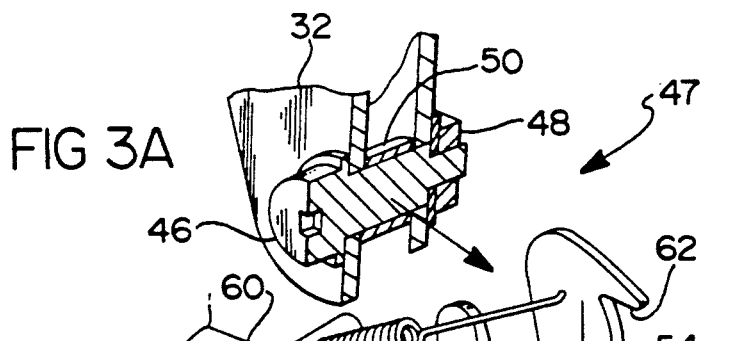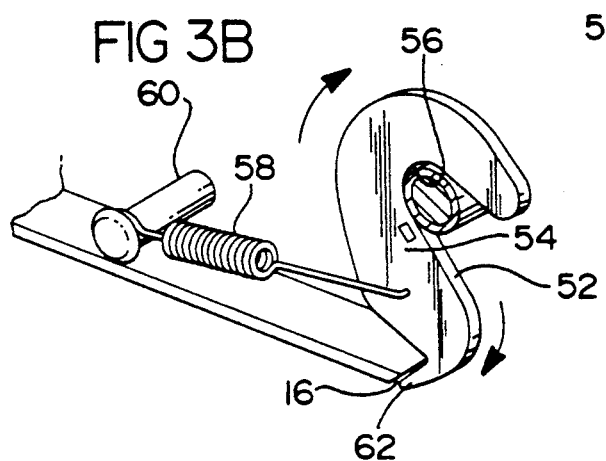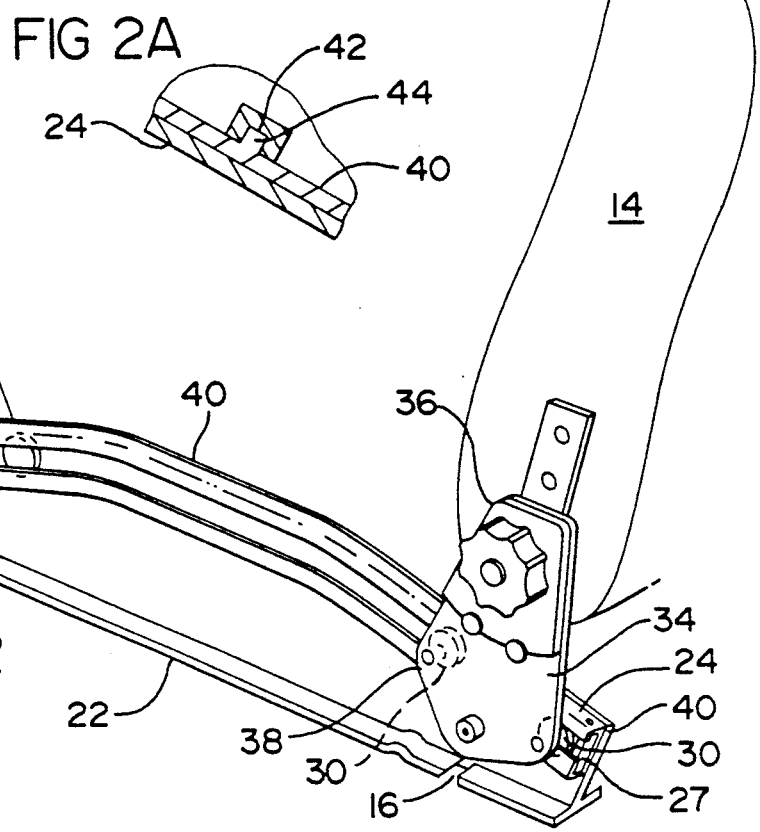

ARTICULATED SEAT ASSEMBLY

BACKGROUND OF THE INVENTION

1. Field of the Invention

The invention relates to vehicular seating. More particularly, the present invention relates to adjustable vehicle seats capable of multiple seating positions in the vehicle.

2. Prior Art

Adjustable seating of various types has been known for use in automotive applications, particularly in vans. It is known to use both the passenger seats and the driver's seat which are pivotable to face in multiple directions. Such seats are useful in various applications. For example, socializing in the interior of the van.

One such seat is disclosed in U.S. Pat. No. 3,147,945 issued Mar. 28, 1962 to J. D. Leslie et al and is entitled "MANUAL SIX-WAY SEAT ADJUSTER". Leslie teaches a mechanism for manually adjusting a vehicle seat relative to the floor thereof The seat adjuster unit of Leslie consists of three mechanisms. A first mechanism regulates the fore and aft movement of the seat. A second mechanism regulates vertical movement at the front portion of the seat. A third mechanism regulates rear up and down movement of the rearward portion of the seat.

While the seat adjuster of Leslie allows for multiple adjustments of the position of a seat, Leslie does not provide movement of the back portion relative to the base portion of the seat.

A second seating apparatus is disclosed in U.S. Pat. No. 4,470,632 issued Sep. 11, 1984 to Babbs and is entitled "VEHICLE SEAT MOUNTINGS". Babbs teaches a vehicle seat support system which enables a variety of adjustments to be made to the position of a seat and its configuration within a vehicle. The seat support of Babbs may be either motorized or manual. In the design of Babbs, a first slide member is slidably mounted to a second slide member which is mounted to the floor of the vehicle. The second slide member is provided at the ends thereof with mechanisms to raise and lower the front and rear of the seat. The first slide member may include a pivotal mount for attachment to the seat back to allow pivotal tilting of the seat back with respect to the seat bottom portion. The system of Babbs also may include a microprocessor to control motorized movement of the seat. No provision is made for movement of the seat back other than to tilt with respect to its mounting on the seat bottom portion.

Another seating device is disclosed in U.S. Pat. No. 4,781,415 issued Nov. 1, 1988 to Heesch et al. and is entitled "RECLINING INFINITELY VARIABLE SEAT LATCH WITH DUAL LOCKING MECHANISMS APPARATUS AND METHOD". Heesch teaches a reclining seat latch which is infinitely adjustable to a multiplicity of positions. A pawl member is engageable with a clutch gear of the seat latch assembly. While Heesch teaches a fairly complicated mechanism for a control device for tilting a seat back relative to a seat bottom portion, no disclosure is found in Heesch of any other movement of the seat back relative to the seat bottom portion except for tilting and reclining thereof.

Still another seating device is disclosed in U.S. Pat. No. 4,787,674 issued Nov. 29, 1988 to Inaba et alia and is entitled "SEAT ADJUSTING APPARATUS". Inaba teaches an automotive seat having a seat back and seat bottom. The seat bottom and seat back are movable in opposite directions from each other. This provides adjustment for occupants of different heights. While certain adjustments can be made in the apparatus of Inaba to accommodate seat occupants of differing heights, the back rest portion always remains at the back end of the seat portion in this design.

Yet still another seating apparatus is disclosed in U.S. Pat. No. 4,796,951 issued Jan. 10, 1989 to Tamura et alia and is entitled "AUTOMOTIVE SEAT". Tamura teaches a design for a seat in which the seat bottom is slidable horizontally to accommodate persons of varying height. A main sliding mechanism is provided for adjusting the entire seat in a fore-and-aft direction. An auxiliary sliding mechanism is provided for adjusting a seat cushion in the fore-and-aft direction relative to the main sliding mechanism. No disclosure of any movement of the seat back portion other than concurrent movement with the main sliding mechanism is found in this reference.

While various types of adjustable seats are known, a need still exists for an adjustable passenger seat which can be easily adjusted from a first, forward-facing position to a second, rearward-facing position without requiring pivotable movement of the entire seat.

SUMMARY OF THE INVENTION

The present invention provides an adjustable vehicular seat assembly which is movable from a first, forward-facing orientation thereof to a second, rearward-facing orientation thereof without requiring pivoting of the entire seat.

A vehicular seat assembly in accordance with the present invention, generally, comprises:

(a) a seat base member having a front edge and a back edge;

(b) a seat back which extends upwardly above the base member, the seat back having a lower end; and (c) means for allowing translation of the seat back from a first position wherein the lower end of the seat back is disposed proximate the back edge of the seat base member to a second position wherein the lower end of the seat back is disposed proximate the front edge of the base member.

The assembly of the present invention may also include means for pivotally adjusting the seat back member, and means for allowing the seat back to be folded downwardly to contact the seat base member.

For a more complete understanding of the present invention, the reader is referred to the following detailed description section, which should be read in conjunction with the accompanying drawings. Throughout the following description and in the drawings, like reference numbers refer to like parts through the several views, in which:

BRIEF DESCRIPTION OF THE DRAWINGS

FIG. 1 is a perspective view of an adjustable seat in accordance with the present invention where the second position for deploying the seat back is depicted in shadow;

FIG. 2 is a perspective view of the seat of FIG. 1, partially disassembled to show the construction thereof;

FIG. 2A is a partial cross-sectional view through the guide rail and seat of FIG. 1;

FIGS. 3A and 3B are sequential views of a suitable latching mechanism for latching the seat back in a given orientation thereof;

FIG. 4A is a cross-sectional view of the latching and adjustment mechanism for the seat back, taken along the line 3—3 and showing the cam in an engaged position for upright retention of the seat back;

FIG. 4B is a similar view to that of FIG. 3A showing the cam in a disengaged position for pivotal folding of the seat back; and FIG. 4C is a detail plan view of the mechanism of FIG. 4A, partial in cross section.

DETAILED DESCRIPTION OF THE PREFERRED EMBODIMENTS

Referring now to FIG. 1, an adjustable vehicular seat assembly in accordance with the present invention is indicated generally at 10. The seat assembly 10 comprises a seat base 12, seat back 14, means 16 for translating the seat back 14 from a first position to a second position relative to the seat base 12, and means 18 for fixing the orientation of the seat back 14 relative to the seat base 12.

The seat assembly 10 includes a two-part support frame 12, 12' for supporting a seat base 20 and attaching the seat base 20 to the floor of a vehicle (not shown). The support frame 12' shown in FIG. 1 is substantially the mirror image of the support frame 12 which is completely shown in FIG. 1. Accordingly, only the support frame 12 will be described, and this description will be understood to apply to the corresponding mirror image support frame 12'.

Referring now to FIGS. 1 and 2, the support frame 12 can be seen as comprising a plurality of base bars 22 and a corresponding plurality of guiderails 24. The base bar 22 contacts floor of a vehicle (not shown). The base bar 22 may have slots 16 formed therein to accommodate a post (not shown) for mounting of the seat in a vehicle. Alternatively, the base bar 22 may have threaded posts (not shown) extending downwardly therefrom to pass through the floor of a vehicle passenger compartment for use in mounting the seat assembly 10 in a vehicle. As shown in FIG. 2, the base bar 22 may be formed in the shape of an inverted T, as seen in cross section, with a backing plate 40 extending upwardly thereon and continuous behind the guide rail 24. The guide rail 24 has a subsequently C-shaped cross-section. The guide rail 24 comprises an upper flange 26, a back flange 27 and a lower flange 28. The upper flange 26 and the lower flange 28 are a substantially flat L-shaped members. The upper flange 26 and the back flange 27 are integral with each other. Likewise, the back flange 27 and the lower flange 28 are integral, such that the guide rail 24 has the requisite C-shape. The upper flange 26, back flange 27 and lower flange 28 cooperate to define a channel 29 within the guide rail 24.

A reinforcing member 32 mounts the seat back 14 to the support frame 12. The reinforcing member 32 comprises an inner plate 34 and an outer plate 36 which is connected to the inner plate 34. A pair of rollers 30 rotatably attached to the inner plate 34 by rivets 38 or other appropriate fasteners. The rollers 30 ride inside the channel 29 of the guide rail 24 to support the seat back 14 thereon.

A seat base 20 is disposed between the guide rails 24 of the support frame 12, 12' and, as is conventional in the art, the seat base 20 contains springs and padding. Preferably, the seat base 20 is pivotally attached at the center thereof to the support frame 12, 12'. This pivotal attachment is shown by way of example in FIG. 2A in which a cylindrical socket 42 is embedded in the seat base 20 and the socket 42 receives a pivot pin 44 therein, the pivot pin 44 extending inwardly into the seat assembly 10 from the backing plate 40 which is an extension of the base bar 22 inboard of the guide rail 24.

FIGS. 3A and 3B illustrate one locking mechanism 47 which is usable with the sliding seat back 14 and reinforcing member 32 of the present invention. The locking mechanism 47 of FIGS. 3A and 3B provides a means for fixing the orientation of the seat back 14 with respect to the seat base 20. The inner plate 34 of the reinforcing member 32 has a threaded fastener attached thereto at the base thereof, such as the allen-head bolt 46 and nut 48 illustrated in FIG. 3A. The nut 48, bolt 46 and inner plate 34 are shown in cross-section for ease of illustration. A hollow, cylindrical bushing 50 is disposed around the shaft of the bolt 46.

A rotatable latch member 52 is pivotally mounted on a pin 54 at each end of the base bar 22. As the seat back 14 is rolled backwardly in the guide rail 24, the bushing 50 strikes the latch member 52 and causes it to rotate about the pin 54. The latch member 52 is formed with a recess 56 therein, and after rotation of the latch member 52, the recess 56 encloses the bushing 50 therein. A spring 58 has one end attached to the latch member 52 and the other end attached to a post 60 which is affixed to the base bar 22. After the latch member 52 rotates sufficiently for the attachment point of the spring 58 to pass below the pivot pin 54, the spring 58 then exerts a pulling force to move the latching member 52 into the position shown in FIG. 3B.

A tab 62 on the latch member 52 catches against the end of the base bar 22 at the edge of one of the slots 16. This fixes the latch member 52 in position on each side of the seat back 14, and serves to fix the position of the seat back 14 with respect to the support frame 20. A manual release lever 64 must be pulled, in conjunction with pressure on the seat base 12 in the desired direction, in order to release the latch member 52 from engagement with the base bar 22 to allow slidable movement of the seat back 14 with respect to the support frame 20. The spring 58 places tension on the latch member 52 as the seat back 14 is locked into position, and when the manual release lever 64 is tripped, the spring 58 releases the latch member 52 from engagement with the bushing 50 after partial rotation of the latch member 52 to the point where the spring end passes above the pivot pin 54.

As illustrated in FIGS. 4A and 4B, the reinforcing member 32 includes a mechanism to allow for both adjustment and release of the seat back 14. The outer plate 36 has an offset portion 66 with gear teeth 68 formed at the lower edge thereof adjacent the offset portion 66. These gear teeth 68 define an arcuate path along the lower edge of the outer plate 36. In a similar fashion, the inner plate 34 has an offset portion 70 formed therein with a toothed upper surface 72 formed at the upper edge of the offset portion 70. The toothed upper surface 72 of the inner plate 34 engages matingly with the toothed lower surface 68 of the outer plate 36 to fix the position of the seat back 14 with respect to the seat base 20.

The outer plate 36 has a circular hole 74 formed therein which receives a camshaft 76 therethrough. The inner plate 34 has a non-circular hole 78 formed therethrough to receive a non-circular cam lobe 80 of the camshaft 76 therein. The camshaft 76 acts as a pivot pin for movement of the outer plate 36 and seat back 14 with respect to the inner plate 34 and seat base 20. The non-circular lobe 80 of the camshaft 76 is biased into the non-circular hole 78 of the inner plate 34 in the following manner. A spring cover plate 82 is attached to the outer plate 36 by suitable fasteners, such as rivets 84 or the like. The spring cover plate 82 extends inwardly behind the inner plate 34 and is formed in the shape of a rounded dish, as shown. The spring cover plate 82 extends inwardly behind the inner plate 34 and is formed in the shape of a rounded dish, as shown. The spring cover plate 82 has a central circular hole 86 formed therein to receive the camshaft 76 therethrough.

A circular coil spring 88 is disposed below the spring cover plate 82 and a pressure plate 90 is disposed between the circular coil spring 88 and the non-circular cam lobe 80. The pressure plate 90 has a circular hole 91 formed therein, which is large enough to receive the camshaft 76 therethrough but which is not large enough to allow the non-circular cam lobe 80 to pass therethrough. The circular coil spring 88, thus, pushes the pressure plate 90 to bias the pressure plate 90 against the non-circular cam lobe 80. This pressure against the cam lobe 80 presses the cam lobe 80 outwardly and if the orientation of the non-circular cam lobe 80 is lined up with the non-circular hole 78 in the inner plate 34, then the pressure plate 90 will force the non-circular cam lobe 80 into the non-circular hole 78 to the orientation shown in FIG. 4A.

A generally rounded handle 92 is attached to the camshaft 76 at the end thereof opposite the spring cover plate 82. The handle 92 is formed with a plurality of finger grips 93 around the circumference thereof, as shown. When the handle 92 is manually rotated with the teeth 68, 72 of the inner plate 34 and outer plate 36 engaged as shown in FIG. 4A, the seat back 14 is able to be pivotally adjusted to a preferred position thereof. The camshaft 76 has a circumferential groove 94 formed adjacent the outer end thereof. The handle 92 is formed with a hollow bore 95 formed centrally and coaxially therethrough to allow it to slide over the camshaft 76. An enlarged well 96 is forced inside the handle 92 coaxial with the hollow bore 95 and a second coil spring 97 is disposed in the enlarged well 96 surrounding the camshaft 76. A washer 98 fits over the camshaft 76 to hold the second coil spring 97 in place, and a C-clip snaps into the circumferential groove 94 to retain the washer 98 and the second coil spring 97 in place therebelow. A button 99 is disposed coaxially at the end of the camshaft 76 and contains a one-way slide-on fastener 100 to retain it on the camshaft 76.

When a user of the seat wishes to fold the seat back 14 downwardly until it contacts the seat base 20, for loading luggage or to allow passengers to bypass the seat assembly 10, the button 99 is pressed inwardly to force the camshaft 76 to move inwardly in the reinforcing member 32 against the pressure of the springs 88, 97. The inward movement of the camshaft 76 moves the non-circular cam lobe 80 out of alignment with the non-circular hole 78 in the inner plate 34, and this, then, allows the outer plate 36 to move upwardly to take the toothed edge 68 of the outer plate 36 out of alignment with the toothed edge 72 of the inner plate 34, thus allowing the seat back 14 to pivot forwardly until it contacts the seat base 20. A pair of shouldered rivets 102 are attached through the inner plate 34 and the shoulders of the rivets 102 overlap the lower edge of the outer plate 36 in order to support and guide the outer plate 36 during pivotal movement thereof.

Although the present invention has been described herein with respect to a specific embodiment thereof, it will be understood that the foregoing description is intended to be illustrative, and not restrictive. Many modifications of the present invention will occur to those skilled in the art. All such modifications which fall within the scope and spirit of the present invention.

Having, thus, described the invention, what is claimed is:

1. A vehicular seat assembly, comprising:
    (a) a seat base having a front edge and a back edge;
    (b) a seat back which extends upwardly above the base, and seat back having a lower end;
    (c) means for allowing translation of the seat back from a first position wherein the lower end of the seat back is disposed proximate the back edge of the seat base to a second position wherein the lower end of the seat back is disposed proximate the front edge of the seat base;
    (d) a support frame comprising a pair of guide rails having a plurality of slots formed therein, the seat back being slidably disposed upon the guide rails; and
    (e) means for fixing the position of the seat back relative to the guide rails, the means for fixing comprising a plurality of latch members rotatably disposed upon the guide rails, each of the latch members comprising a curvilinear member defining a recess, each of the latch members being rotatable so that a bushing fixed to the seat back is encompassed within the recess, each latch member acting to fix the position of the seat back by this interface with the bushing, each latch member further comprising a tab integral to the curvilinear member, the tab fitting within one slot of the rails which the latch member is rotated, such that the tab acts to fix the position of the latch member relative to the rail and therefore the seat back.

2. The assembly of claim 1, further comprising means for allowing the seat back to be pivotally folded downwardly to contact the seat base member.

3. The assembly of claim 1, wherein the seat base member is pivotally movable in coordination with movement of the seat back.

4. A latching and adjustment mechanism for a seat, comprising:
    (a) an outer plate having an offset portion with a toothed surface at the offset portion, the offset portion having a hole formed therethrough;
    (b) an inner plate having an offset portion with a toothed surface at the offset portion which is engageable with the toothed surface of the outer plate, the offset portion having a non-circular hole formed therethrough which is alignable with the hole in the outer plate;
    (c) a shaft which fits through the holes formed in the inner and outer plates, the shaft having a non-circular cam thereon which fits into the hole in the inner plate;
    means for biasing the cam into the hole of the inner plate; and
    a button at an outer end of the shaft for pressing by a user to move the cam out of the hole in the inner plate to allow the toothed surfaces of the inner and outer plates to come out of engagement and to slip past one another.

* * * * *

UNITED STATES PATENT OFFICE
CERTIFICATE OF CORRECTION

Patent No. 5,322,341          Dated June 21, 1994

Inventor(s)   Arduino Colasanti et alia

It is certified that error appears in the above-identified patent and that said Letters Patent is hereby corrected as shown below:

Column 1, line 21: after "thereof" insert --.--.

Column 5, line 43: replace "forced" with --formed--.

Column 6, line 15: replace "and" with --the--.

Signed and Sealed this

Eleventh Day of October, 1994

Attest:

BRUCE LEHMAN

Attesting Officer     Commissioner of Patents and Trademarks